April 23, 1963   P. P. PACUK   3,086,785
WHEEL-MOUNTED RIDER-PROPELLED ROCKING HOBBY HORSE
Filed June 21, 1961
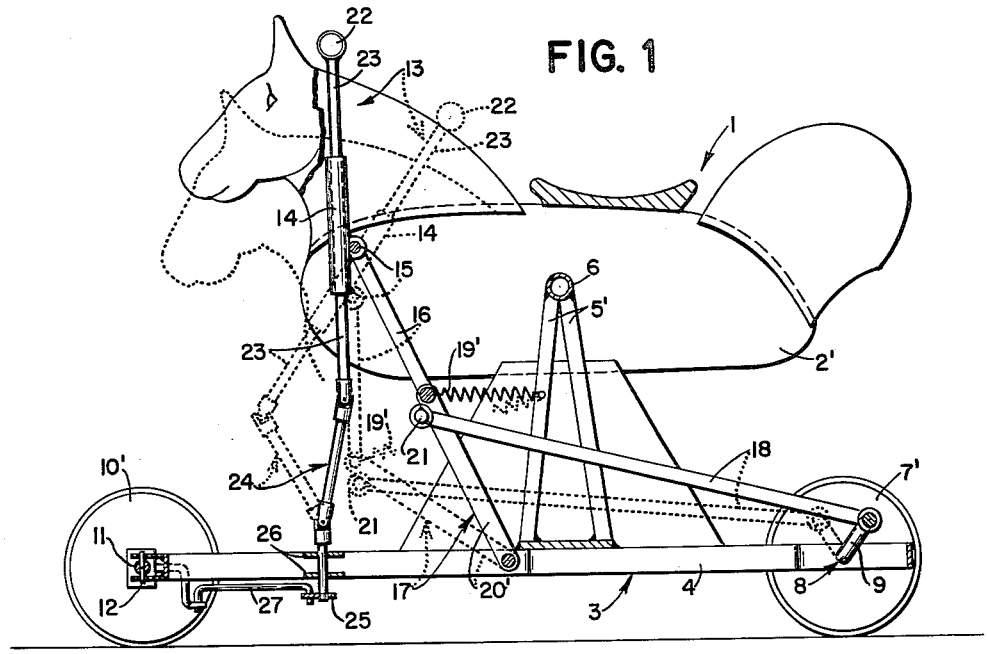
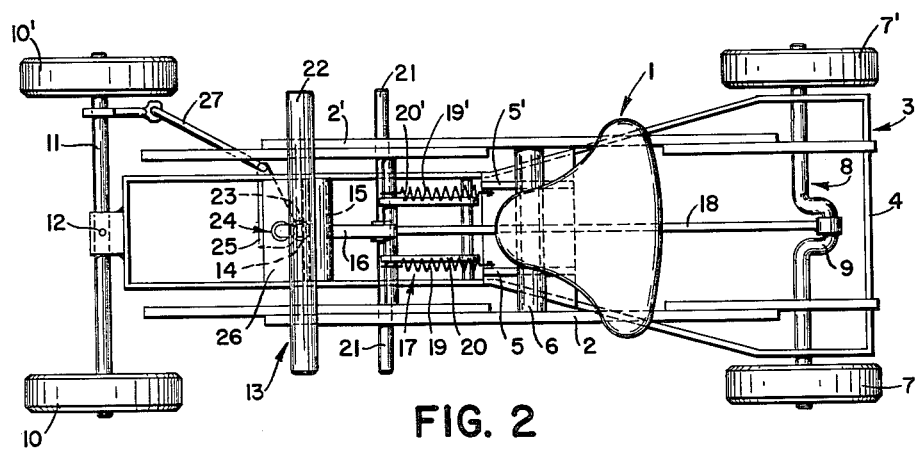
INVENTOR
PETER P. PACUK
BY
Pennie, Edmonds, Morton, Barrows & Taylor
ATTORNEYS 3,086,785
WHEEL-MOUNTED RIDER-PROPELLED ROCKING HOBBY HORSE
Peter P. Pacuk, 2355 Cedar Shores Circle, Jacksonville, Fla.
Filed June 21, 1961, Ser. No. 118,663
4 Claims. (Cl. 280—1.196)

This invention relates to a child's toy and more particularly to a rocking hobby horse on wheels which can be safely and easily driven and steered.

The drive and steering mechanism of this invention is particularly designed to utilize the combined motive forces of the child's arms and legs aided by a return assist spring. The invention concentrates all these combined motive forces into a drive frame which in turn imparts the power to drive wheels via a drive rod. Since all the motive forces of the child's body are utilized and are further supplemented by a return assist spring the device takes little effort to operate. For the same reasons it is safe, since the child can stop the movement of the rocking horse by either the use of his arms or his legs or both. These power and safety features of the invention also impart a rocking motion to the horse thus maintaining the pleasurable aspects of the toy.

Broadly the invention relates to a rocking hobby horse comprising a main frame to which a horse-shaped body is pivotally mounted. Steerable wheels and drive wheels are rotatably mounted on the main frame, the drive wheels being rotated by a drive means connecting the horse-shaped body with the drive wheels so that when the horse-shaped body is pivoted from a neutral position, a driving force is imparted to the drive wheels. A steering unit is pivotally connected to the body portion and is connected to the drive means so that when the steering unit is pivoted on the body portion a driving force is imparted to the drive wheels. A return assist spring urges the body portion back to a neutral position. The steering unit is also connected to the steerable wheels so that when the steering unit is rotated, the steerable wheels are turned.

Referring to the drawings in which a preferred embodiment of my invention is illustrated, FIG. 1 represents a side sectional view of the rocking horse at rest in a neutral position and in a rocking position; and FIG. 2 is a plan view of the rocking horse shown in FIG. 1.

Referring to FIG. 1 in greater detail, my invention comprises a horse-shaped body generally denoted as 1, having side portions 2 and 2' and a main frame generally denoted as 3. The main frame in turn comprises a horizontal member 4 and upright members 5 and 5'. The upright members are secured to the horizontal member by either welding, as shown, or by other suitable means. The horse-shaped body 1 is mounted upon the upper part of the upright members 5 and 5' by a pivot bar 6. Two drive wheels 7 and 7' are rotatably attached to the rear part of the horizontal member 4 by means of an offset drive axle 8, having an offset portion 9, which is journaled to the horizontal member 4. Two steerable wheels 10 and 10' are rotatably attached to a front axle 11 which in turn is rotatable about a pin 12 mounted on the front part of the horizontal member 4.

The drive means is in part actuated by a steering unit, generally denoted as 13. The drive means comprises a tubular member 14 attached to the body 1 by means of a pivot bolt 15, a connecting member 16 affixed to the middle part of the tubular member at its one end and pivotally attached to the upper ends of a drive frame denoted generally by 17, a drive rod 18 and return assist springs 19 and 19'. The drive frame 17 comprises two parallel bars 20 and 20' and a horizontal stirrup bar 21 affixed perpendicular to and across the upper parts of the parallel bars 20 and 20'. The drive rod 18 is pivotally connected at its one end to the stirrup bar 21 and at its other end to the offset portion 9 of the offset axle 8. The stirrup bar extends outward of the horse-shaped body 1 to provide placement portions for the child's feet. The lower ends of the drive frame are pivotally attached by bolts, pins or other suitable means to the horizontal member 4.

The steering unit 13 comprises a hand bar 22 and an upright articulated steering rod 23 which is slidably positioned within the tubular member 14. The lower end of the articulated steering rod 23 is attached by means of a universal joint 24 to the upper end of a steering member 25. The steering member 25 is supported by a cross piece 26, which is secured to the horizontal member 4, in such a manner that the steering member 25 is free to rotate. The steering member 25 is connected to the front steering wheels 10 and 10' by a suitable connecting rod 27.

The steps involved in operating the device are simple. The child sits upon the horse-shaped body 1 and holds on to the horizontal hand bar 22. His feet rest upon the outwardly extending portions of the stirrup bar 21. To move the rocking horse forward along the ground and at the same time cause the horse-shaped body 1 to rock, the child merely pulls back and down upon the hand bar 22 and pushes down and forward upon the stirrup bar 21. The power of the child's arms thus causes the steering rod 23 to act upon the tubular member 14 causing it to pivot about and press down upon the pivot bolt 15 which being attached to the horse-shaped body 1 causes the body 1 to dip in a rocking motion. The power from the child's arms is simultaneously transferred to the connecting member 16 causing it to also pivot about pivot bolt 15 and thereby causing the drive frame 17 to swing down and forward. The drive frame 17 is also caused to swing down and forward by the thrust of the child's legs upon the stirrup bar 21. Thus all the forces of the child's body movements combine to act upon the drive frame 17. The forces thus combined are transferred to the offset portion 9 of the offset drive axle 8 through the drive rod 18 thereby causing the axle 8 and the drive wheels 7 and 7' to turn. At the end of the downward movement of the drive frame 17 the child releases his foot pressure upon the stirrup bar 21. The drive frame 17 is then brought into its full upward position by pushing the hand bar 22 forward and up. This motion is aided by the spring power of the return assist springs 19 and 19'. The child's arm power and the spring power thus combine to act upon the drive frame 17 which in turn transfers the forces to the offset axle 8 and the drive wheels 7 and 7' via the drive rod 18 to cause the wheels to rotate through the second half of their arc. To stop or reverse the movement of the toy, the forces are applied in the opposite direction.

Steering is accomplished by merely using the arms and hands to apply rotational forces to the hand bar 22 which forces are transferred to the steerable wheels 10 and 10' via the articulated steering rod 23, the steering member 25 and the connecting rod 27. Because the steering rod 23 is slidably mounted in the tubular member 14, steering can be accomplished without any loss of power control over the drive mechanism. Similarly power may be maintained without loss of steering control.

It is understood that the invention is not to be limited to the particular embodiment illustrated herein, but that changes and variations may be made without departing from the spirit of the invention or the scope of the claims.

I claim:

1. A rocking hobby horse comprising a main frame, a horse-shaped body pivotally mounted upon said main frame, steerable wheels rotatably mounted upon said main frame, drive wheels rotatably mounted upon said main frame, drive means connecting said horse-shaped body to said drive wheels so that when said body is pivoted on said main frame from a neutral position a driving force is imparted to said drive wheels, a steering unit for steering said steerable wheels rotatably and pivotally connected to said body, said steering unit being connected to said drive means so that when said steering unit is pivoted on said body a driving force is imparted to said drive wheels, and a return assist spring operatively connecting the drive means to said main frame to impart a driving force to said drive wheels while urging said body to return to said neutral position.

2. A rocking hobby horse according to claim 1 wherein said drive means comprises a tubular member pivotally attached to said body, a connecting member one end of which is rigidly affixed to said tubular member, a drive frame having two substantially upright parallel bars and a horizontal stirrup bar affixed near and across the upper ends of the parallel bars, said connecting member being pivotally mounted to the upper ends of said drive frame, the lower ends of said drive frame being pivotally attached to said main frame, an offset drive axle having an offset portion, said offset drive axle being journaled to said main frame with said drive wheels attached thereto, a drive rod pivotally attached at one end to said horizontal stirrup bar and its other end to said offset portion of said drive axle.

3. A rocking hobby horse on wheels comprising a horse-shaped body, a main frame having a horizontal member and upright members, the lower ends of said upright members being affixed to said horizontal member near the mid section of said horizontal member, said horse-shaped body being pivotally mounted upon the upper end of said upright members by means of a pivot bar, at least one drive wheel rotatably attached to an end of said horizontal member, an offset drive axle having an offset portion connecting said drive wheel to said horizontal member, at least one steerable wheel rotatably attached to the other end of said horizontal member, a tubular member pivotally mounted within said horse-shaped body, a connecting member one end of which is rigidly affixed substantially at the pivot point of said tubular member such that the longitudinal axis of said connecting member lies in a plane containing the longitudinal axis of said tubular member, the longitudinal axis of said connecting member being inclined downward and to the rear of said tubular member, a drive frame comprising two substantially upright parallel bars and a horizontal stirrup bar affixed near and across the upper ends of said parallel bars and extending outwardly of said parallel bars to provide foot placement portions, the longitudinal axis of said parallel bars lying in a plane substantially parallel to the plane containing the longitudinal axes of said tubular member and said connecting member, said connecting member being pivotally mounted to the upper ends of said drive frame and the lower ends of said drive frame being pivotally mounted at a point slightly forward of said upright members, a drive rod pivotally attached at one end to the horizontal stirrup bar of the drive frame and at its other end pivotally attached to said offset portion of said offset drive axle, return assist springs connecting part of said drive frame with said upright members, a hand steering unit comprising an upright articulated steering rod slidably positioned in said tubular member and a hand bar affixed perpendicularly to the upper end of said articulated steering rod and substantially perpendicularly to the longitudinal axis of the main frame when said steerable wheel is straight ahead, the lower end of said articulated steering rod being connected by a universal joint to a steering member, said steering member being supported and rotatably positioned in a cross piece attached to said horizontal member of the main frame, and connecting rods linking said steering members to said steerable front wheels.

4. A rocking hobby horse comprising a main frame; a horse-shaped body pivotally mounted upon said main frame; steerable wheels rotatably mounted upon said main frame; drive wheels rotatably mounted upon said main frame; drive means connecting said horse-shaped body to said drive wheels; a steering unit for steering said steerable wheels, said steering unit comprising a tubular member pivotally attached to said body, an articulated steering rod slidably positioned in said tubular member having a hand bar affixed to one of its ends, a steering member supported and rotatably positioned in a cross piece attached to said main frame, said articulated steering rod being connected at its other end to said steering member, and connecting rods linking said steering member to said steerable wheels; said steering unit further being connected to said drive means so that when said steering unit is pivoted on said body, said body is pivoted on said main frame from a neutral position thereby imparting a driving force to said drive wheels; and a return assist spring operatively connecting said drive means to said main frame to impart a driving force to said drive wheels while urging said body to return to a neutral position.

References Cited in the file of this patent

UNITED STATES PATENTS

| | | |
|---|---|---|
| 468,572 | Marquardt | Feb. 9, 1892 |
| 1,385,320 | Frick | July 19, 1921 |
| 1,393,512 | Dunning | Oct. 11, 1921 |
| 1,506,726 | Alexander | Aug. 26, 1924 |
| 1,571,202 | Karcher | Feb. 2, 1926 |
| 2,626,161 | Thacker | Jan. 20, 1953 |